United States Patent Office 3,472,873
Patented Oct. 14, 1969

---

3,472,873
ISOMERIZATION OF 2,5-DIHYDROTHIOPHENE-1,1-DIOXIDE
Robert E. Rinehart, Rutherford, N.J., assignor to Uniroyal, Inc., New York, N.Y., a corporation of New Jersey
No Drawing. Application Oct. 3, 1963, Ser. No. 313,424, which is a continuation of application Ser. No. 262,347, Mar. 4, 1963. Divided and this application Apr. 15, 1968, Ser. No. 740,010
Int. Cl. C07d 63/12
U.S. Cl. 260—332.1                              1 Claim

ABSTRACT OF THE DISCLOSURE

This invention relates to a new method for isomerizing certain monomeric olefinic cyclic compounds.

---

This is a division of application Ser. No. 313,424 filed Oct. 3, 1963, which is a continuation of Ser. No. 262,347 filed Mar. 4, 1963 and now abandoned.

Isomerization of olefins often is conducted under conditions involving relatively high temperatures, as in the gas phase, or in the presence of large amounts of acids or bases [cf. Emmett, "Catalysis," vol. VI, Reinhold, New York (1958)]. Very often decomposition accompanies the isomerization, resulting in lowered yields. These methods, which require large amounts of heat or catalysts, are inefficient.

The present invention provides a simple method for the isomerization of certain olefinic compounds to useful isomers under mild conditions of temperature and pressure.

The monomeric olefinic cyclic compound that may be isomerized by the process of the present invention is, 2,5-dihydrothiophene 1,1-dioxide. According to the present invention, this compound is isomerized by treatment with a rhodium salt.

In carrying out the present invention, either the monomeric olefinic cyclic compound to be isomerized is contacted with the rhodium salt directly as by dissolving the rhodium salt in the compound, or the isomerization may be carried out in a liquid medium as in water, or in an organic solvent such as ethanol, ethylene glycol, dimethylformamide, dimethyl sulfoxide, tetrahydrofuran, acetic acid. The time and temperature of treatment with the rhodium salt are not critical and generally will be from 1 hour to 10 days, at temperatures from 20° C. or below to 100° C., generally from 40° C. to 100° C. Higher temperatures can be used but offer no advantage and are often disadvantageous because the resultant increase in vapor pressure may require the use of pressure equipment.

The rhodium salts that may be used are the salts of conventional acids, such as rhodium chloride, bromide, iodide, sulfate, acetate, nitrate and the like. The amount of rhodium salt is not critical, and usually from 0.0001 to 10 mole per cent based on the olefinic compound will be used.

The following example illustrates the invention.

Example 1

This example shows the isomerization of 2,5-dihydrothiophene 1,1-dioxide to 2,3-dihydrothiophene 1,1-dioxide. 2,5-dihydrothiophene 1,1-dioxide, commonly called butadiene sulfone, is readily available from the addition of $SO_2$ to 1,3-butadiene. The isomer, 2,3-dihydrothiophene 1,1-dioxide is not readily available, requiring a synthesis of several steps from the 2,5-dihydro isomer. We can effect the conversion in one step, by the following procedure.

A solution of 0.5 g. of $RhCl_3 \cdot 3H_2O$ was dissolved in 100 ml. of ethanol. To this was added 10 g. of butadiene sulfone. The solution was placed in a bottle, which was then flushed with argon and sealed. The sample was heated at 50° for 3 days. The solution was then poured into water, and extracted several times with methylene chloride. The combined extracts were dried, then evaporated to dryness. A syrupy liquid remained which showed an infrared unsaturation band at 1600 cm.$^{-1}$, whereas the 2,5-isomer does not have a band at 1600 cm.$^{-1}$. Since a

absorption at about 1600 cm.$^{-1}$ can be expected for unsaturation conjugated with the group

the constitution of the product as 2,3-dihydrothiophene 1,1-dioxide is established.

Upon recrystallization from ether, white crystals were obtained melting at about 45° C., compared with literature value of 48–49° C.

In view of the many changes and modifications that may be made without departing from the principles underlying the invention, reference should be made to the appended claim for an understanding of the scope of the protection afforded the invention.

Having thus described my invention, what I claim and desire to protect by Letters Patent is:

1. The method of isomerizing 2,5-dihydrothiophene 1,1-dioxide to 2,3-dihydrothiophene 1,1-dioxide which comprises treating said 2,5-dihydrothiophene 1,1-dioxide with a rhodium salt.

References Cited

Rinehart et al., JACS 84, 4145, November 1962.

HENRY R. JILES, Primary Examiner

C. M. SHURKO, Assistant Examiner